United States Patent [19]
Murphy

[11] 4,154,455
[45] May 15, 1979

[54] LINK CHAIN HITCH ARM FOR TRACTOR MOWER

[76] Inventor: Floyd D. Murphy, Star Rte. 2, Breezewood, Pa. 15333

[21] Appl. No.: 871,692

[22] Filed: Jan. 23, 1978

[51] Int. Cl.² ............................................. B60D 1/16
[52] U.S. Cl. ................................................ 280/461 A
[58] Field of Search .......... 280/456 A, 460 A, 461 A, 280/490 A, 479 A; 56/503, 255, 14.9, DIG. 14, DIG. 22, 15.9; 172/439, 47

[56] References Cited

U.S. PATENT DOCUMENTS 2,405,980  8/1946  Sands ................................ 280/461 A

FOREIGN PATENT DOCUMENTS 184390  6/1963  Denmark ........................... 280/461 A

*Primary Examiner*—Joseph F. Peters, Jr.
*Assistant Examiner*—R. Schrecengost
*Attorney, Agent, or Firm*—Clarence A. O'Brien; Harvey B. Jacobson

[57] ABSTRACT

A rotary mower is supported from the three-point hitch of a tractor with the rear ends of the lower arms of the hitch pivotally attached to opposite sides of the forward portion of the mower and the mower includes a rigid standard with the upper arm of the three-point hitch anchored relative to the upper end of the standard by means of a flexible adjustable length tension member, the rear portion of the mower including dirigible ground engaging support wheel structure. The flexible tension member comprises a length of link chain including front and rear anchor structures for releasable anchoring relative to the upper arm of the three-point hitch and the upper end of the standard, the front and rear anchor structures including double and single clevis assemblies for adjustable anchoring to selected longitudinally spaced portions of the link chain.

6 Claims, 3 Drawing Figures

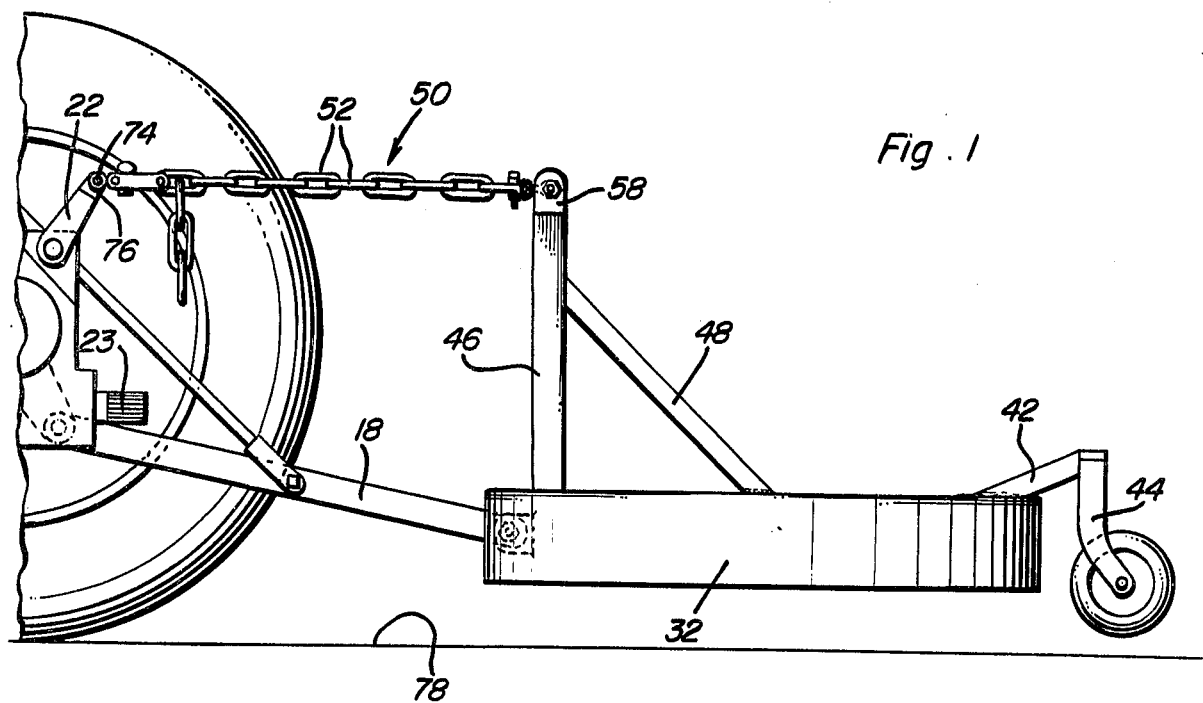
Fig. 1
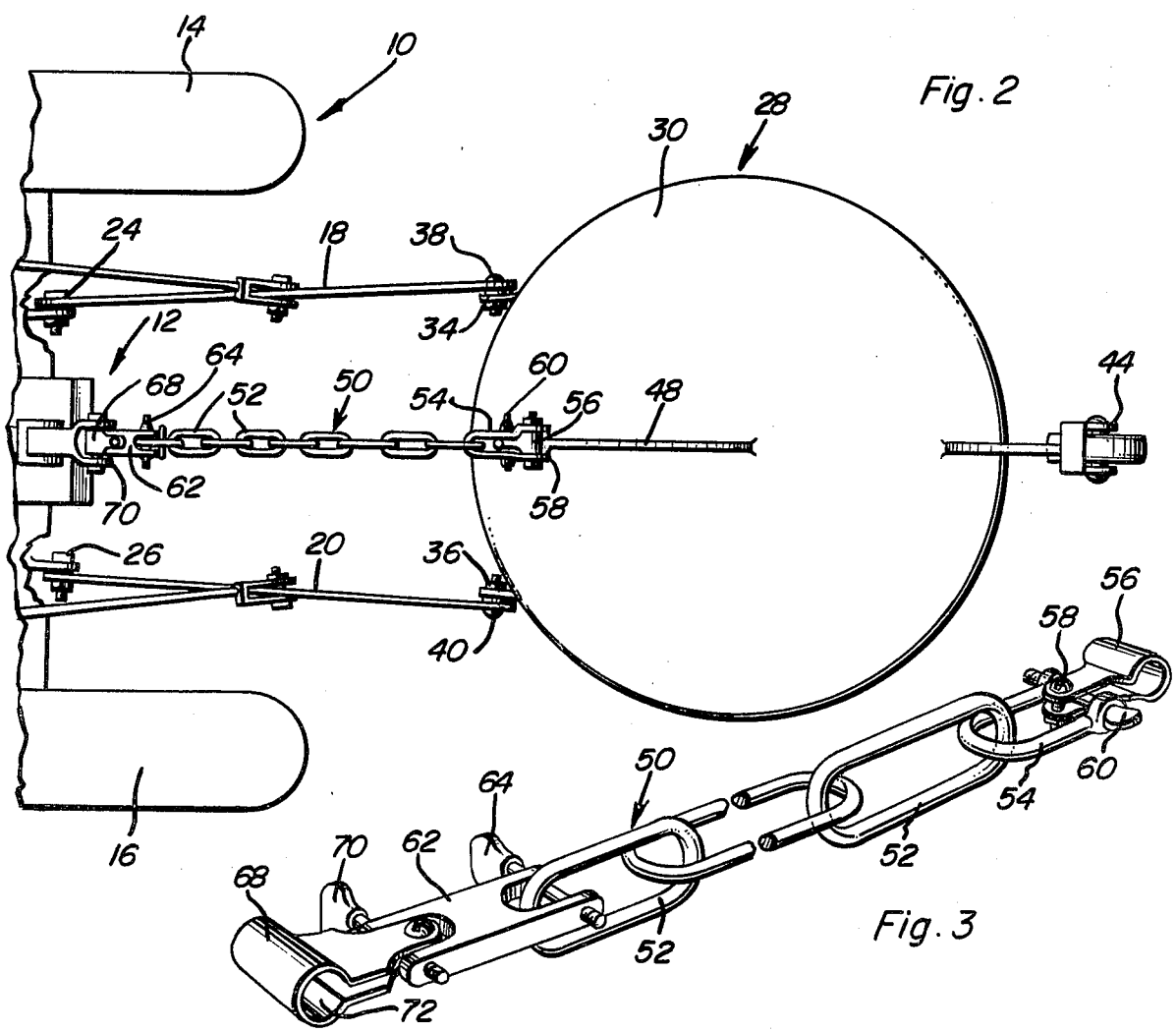
Fig. 2
Fig. 3

LINK CHAIN HITCH ARM FOR TRACTOR MOWER

BACKGROUND OF THE INVENTION

Various forms of rotary mowers as well as other similar implements are supported from the three-point hitches of tractors and are subject to engagement with the ground when the tractor and implement are moving over rough or depressed ground surfaces. Conventionally, such an implement includes an upright standard between whose upper end and the upper arm of the associated three-point hitch an adjustable length rigid linking bar is connected. If such a mounted implement engages the ground because of rough terrain or a depressed area of the ground, undue stresses are placed upon the implement with damage often being inflicted thereon. Accordingly, a need exists for an improved manner of mounting rotary mowers and other similar implements from tractor three-point hitches in order that engagement of the rotary mower or implements with the ground will not cause damage to be inflicted to the mower or implement.

BRIEF DESCRIPTION OF THE INVENTION

The link chain hitch arm of the instant invention is adjustable in length and is to be used in lieu of the conventional adjustable length but rigid connecting link usually utilized between an upper portion of a tractor three-point hitch supported implement and the upper arm of the three-point hitch. By utilizing a link chain as opposed to a rigid connecting link a lost motion connection is provided between the upper arm of the three-point hitch and the implement, thereby allowing the implement, while supported in cantilever fashion, to swing upwardly and forwardly rearwardly of its points of pivotal attachment to the lower arms of the associated three-point lift assembly in the event the rear of the implement or mower engages the ground.

The main object of this invention is to provide an improved connecting link structure between the upright standard of a tractor hitch supported rotary mower or similar implement and the upper arm of the three-point hitch of the tractor.

Another object of this invention is to provide an improved connecting structure which will be readily adjustable in length.

Still another object of this invention is to provide an improved connecting structure which will constitute a lost motion connection for supporting the associated mower or implement in cantilever fashion behind the associated tractor.

A final object of this invention to be specifically enumerated herein is to provide a link chain connecting structure for use between the upper arm of a tractor three-point hitch and an associated mower or similar implement supported in cantilever fashion from the hitch and the connecting structure conforming to conventional forms of manufacture, being of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side, elevational view of the rear portion of a tractor equipped with a conventional form of three-point hitch and with a rotary mower assembly supported in cantilever fashion from the three-point hitch utilizing the link chain connecting structure of the instant invention between the upright standard of the mower and the upper arm of the three-point hitch;

FIG. 2 is a top plan view of the assemblage illustrated in FIG. 1; and

FIG. 3 is a fragmentary, perspective view of the link chain connecting structure of the instant invention with the longitudinal central portion thereof being broken away.

DETAILED DESCRIPTION OF THE INVENTION

Referring now more specifically to the drawings, the numeral 10 generally designates a conventional form of tractor including a three-point hitch 12 disposed between the rear wheels 14 and 16 of the tractor 10. The hitch 12 includes a pair of lower opposite side lift arms 18 and 20 and an upper central lift arm 22. Further, the tractor 10 includes a power take-off shaft 23.

The lower opposite side lift arms 18 and 20 are pivotally supported from the tractor 10 as at 24 and 26 and the rear ends of the lift arms 18 and 20 are secured to opposite side forward portions of a rotary mower assembly generally referred to by the reference numeral 28. The rotary mower assembly 28 includes an upper deck 30 and a peripheral skirt portion 32 depending downwardly from the deck 30. Opposite side portions of the forward end of the skirt 32 include mounting brackets 34 and 36 to which the rear ends of the arms 18 and 20 are pivotally attached by fasteners 38 and 40 and the rear portion of the deck 32 supports a rearwardly projecting mount 42 from whose rear portion a depending ground engageable dirigible support wheel assembly 44 is supported. The forward central portion of the deck 30 includes an upwardly projecting standard 46 and the standard 46 is braced relative to the central portion of the deck 30 by means of an inclined brace 48.

The foregoing comprises a description of a substantially conventional tractor, three-point hitch assembly and rotary mower.

The link chain connecting structure of the instant invention is referred to in general by the reference numeral 50 and comprises a length of link chain including a plurality of interconnected chain links 52. The interior longitudinal dimension of each link 52 is greater than three times the diameter of the material from which each of the links 52 is constructed. The link chain connecting structure 50 includes a single clevis 54 on its rear end secured to a mounting bracket 56 secured about the upper terminal end 58 of the standard 46. The mounting bracket 56 is in the form of a split clamp which may be secured and tightened in a closed position by means of a fastener 58 and the clevis 54 includes a threaded removable pin 60. In addition, the forward end of the link chain connecting structure 50 has one end of a double clevis 62 secured thereto by means of a threaded removable pin 64 similar to the pin 60 and the front end of the double clevis 62 is secured to a anchor bracket 68 similar to the mounting bracket 56 by means of a threaded removable pin 70. The anchor bracket 68 defines a sleeve portion 72 through which an attaching pin 74 is secured in order to anchor the anchor bracket 68 between a pair of spaced furcations carried by the terminal end 76 of the upper arm 22.

It may be readily observed from FIG. 1 of the drawings that the effective length of the link chain connecting structure 50 may be varied by removing the pin 64 and thereafter resecuring the pin 64 in position with the pin 64 passing through a different link 52 of the link chain connecting structure 50. In addition, the pin 60 may be removed in order that the clevis 54 may be removed from the rearmost link 52 and the clevis 54 may be secured through a link 52 of the connecting structure 50 spaced forward of the rearmost link 52 to effect adjustment of the length of the link chain connecting structure extending between the upper end of the standard 46 and the upper arm 22 of the three-point hitch 12.

In operation, it may be seen from FIG. 1 of the drawings that the link chain connection structure 50 is wholly operative to be utilized in conjunction with the lift arms 18, 20 and 22 to support the mower 28 in cantilever fashion from the three-point hitch 12 and with the mower 28 spaced slightly above the ground 78 over which the tractor 10 is moving. Of course, the three-point hitch 12 is of the hydraulically adjustable type and the hydraulic controls (not shown) therefor may be actuated to raise and lower the mower assembly 28. However, should the tractor 10 and mower 12 be moved over rough terrain or over a depressed portion of the ground 78 causing the support wheel assembly 44 to engage the ground 78, the link chain connecting structure 50 will allow mower assembly 28 to pivot upwardly about the fasteners 38 and 40 and the upper end of the standard 46 to move toward the upper arm 22 without undue stress being placed on the standard 46, the brace 48 or the support wheel assembly 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an implement supported in cantilever manner behind a tractor equipped with a three-point hitch including a pair of pivotally supported opposite side lower rearwardly projecting arms and an angularly displaceable upper arm with the implement having the rear ends of the lower arms pivotally attached thereto and the implement including an upwardly projecting standard, an elongated connecting structure extending between and pivotally connected at its opposite ends to said upper arm and the upper end of said standard, said connecting structure comprising a flexible non-stretchable tension member, said tension member comprising a link chain.

2. The combination of claim 1 wherein each end of said link chain includes a clevis provided with a removable cross pin for releasable connection of said opposite ends of said link chain to said upper arm and said standard.

3. The combination of claim 2 wherein said cross pins are each receivable through selected links of said chain, thereby enabling the effective length of said chain to be adjusted.

4. The combination of claim 3 wherein each of said ends of said link chain include a split clamp-type bracket removably supported therefrom by means of the corresponding clevis.

5. The combination of claim 4 wherein one of said clevises comprises a double clevis including a pair of removable cross pins.

6. The combination of claim 5 wherein said brackets are removably anchored relative to said upper arm and said standard.

* * * * *